(12) United States Patent
Lemus et al.

(10) Patent No.: US 9,317,417 B2
(45) Date of Patent: Apr. 19, 2016

(54) SMART DIGITAL MESSAGE ARCHIVAL

(71) Applicant: Verizon Patent and Licensing Inc., Basking Ridge, NJ (US)

(72) Inventors: Anthony Lemus, Irving, TX (US); James T. McConnell, Keller, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 198 days.

(21) Appl. No.: 13/888,727

(22) Filed: May 7, 2013

(65) Prior Publication Data

US 2014/0337590 A1    Nov. 13, 2014

(51) Int. Cl.
*G06F 3/00* (2006.01)
*G06F 12/00* (2006.01)
*G06F 17/30* (2006.01)
*G06F 11/14* (2006.01)

(52) U.S. Cl.
CPC ............... *G06F 12/00* (2013.01); *G06F 17/30* (2013.01); *G06F 11/1456* (2013.01)

(58) Field of Classification Search
CPC ..... G06F 3/065; G06F 3/067; G06F 11/1464; G06F 11/1456; G06F 11/2074
See application file for complete search history.

(56) References Cited

U.S. PATENT DOCUMENTS

| | | | | |
|---|---|---|---|---|
| 8,380,675 | B1 * | 2/2013 | Dwivedi | 707/661 |
| 2007/0168435 | A1 * | 7/2007 | Moraca et al. | 709/206 |
| 2008/0126951 | A1 * | 5/2008 | Sood et al. | 715/752 |
| 2011/0264630 | A1 * | 10/2011 | Edelen | 707/665 |
| 2012/0109898 | A1 * | 5/2012 | Baessler et al. | 707/665 |

\* cited by examiner

*Primary Examiner* — Adam M Queler
*Assistant Examiner* — Trang Ta

(57) ABSTRACT

A device may receive information identifying an attribute to be used when determining whether to archive a digital message. The attribute may be associated with the digital message. The device may determine an attribute value based on the attribute and the digital message. The device may determine an archival weight corresponding to the attribute. The device may compute an archival score for the digital message. The archival score may be based on the attribute value and the archival weight. The device may determine that the archival score satisfies a threshold. The device may archive the digital message based on determining that the archival score satisfies the threshold.

20 Claims, 10 Drawing Sheets

| Message ID 605 | 040313-jsmith | 040113-pjones | 032013-jsmith | 020113-rwhite | 011513-cbrown | 122712-gpalmer |
|---|---|---|---|---|---|---|
| Date of message 610 | 04-03-13 | 04-01-13 | 03-20-13 | 02-01-13 | 01-15-13 | 12-27-12 |
| Value 615 | 0 | .02 | .16 | .68 | .87 | 1 |
| Weight 620 | 7 | 7 | 7 | 7 | 7 | 7 |
| Message from contact 625 | True | False | True | True | False | False |
| Value 630 | 0 | 1 | 0 | 0 | 1 | 1 |
| Weight 635 | 1 | 1 | 1 | 1 | 1 | 1 |
| Reply to message 640 | True | False | False | True | False | False |
| Value 645 | 0 | 1 | 1 | 0 | 1 | 1 |
| Weight 650 | 3 | 3 | 3 | 3 | 3 | 3 |
| Size of message 655 | 25 KB | 120 KB | 1.2 MB | 250 KB | 30 KB | 80 KB |
| Value 660 | 0.0 | 0.1 | 1.0 | 0.2 | 0.0 | 0.0 |
| Weight 665 | 7 | 7 | 7 | 7 | 7 | 7 |
| Archival Score 670 | 0.00 | 4.84 | 11.12 | 6.16 | 10.09 | 11 |

FIG. 6

SMART DIGITAL MESSAGE ARCHIVAL

BACKGROUND

A user may exchange digital messages (e.g., email messages) with other users via the Internet or other networks. These digital messages may be stored, on memory space accessible by a user device, after the digital messages are sent or received. Some user devices may have limited availability for storage of these digital messages. In some instances, a user may archive certain digital messages to make memory space available for the storage of new digital messages, and to preserve digital messages for which the user has no immediate need.

BRIEF DESCRIPTION OF THE DRAWINGS

FIG. 6 is a diagram of an example data structure that stores attributes, attribute values, archival weights, and archival scores associated with digital messages;

DETAILED DESCRIPTION

The following detailed description of example implementations refers to the accompanying drawings. The same reference numbers in different drawings may identify the same or similar elements.

A user of a digital message client (e.g., an email client) may wish to archive one or more digital messages (e.g., email messages). The user may wish to archive the digital messages to make memory space available for saving newly received and/or sent digital messages. The user may want to archive the digital messages based on one or more attributes associated with each digital message. The user may also wish to assign a weight to each attribute to give each attribute more (or less) weight when determining the digital messages to be (or not to be) archived. Implementations described herein may allow a user to archive digital messages based on one or more attributes and weights that are selected by the user.

Figure 1:
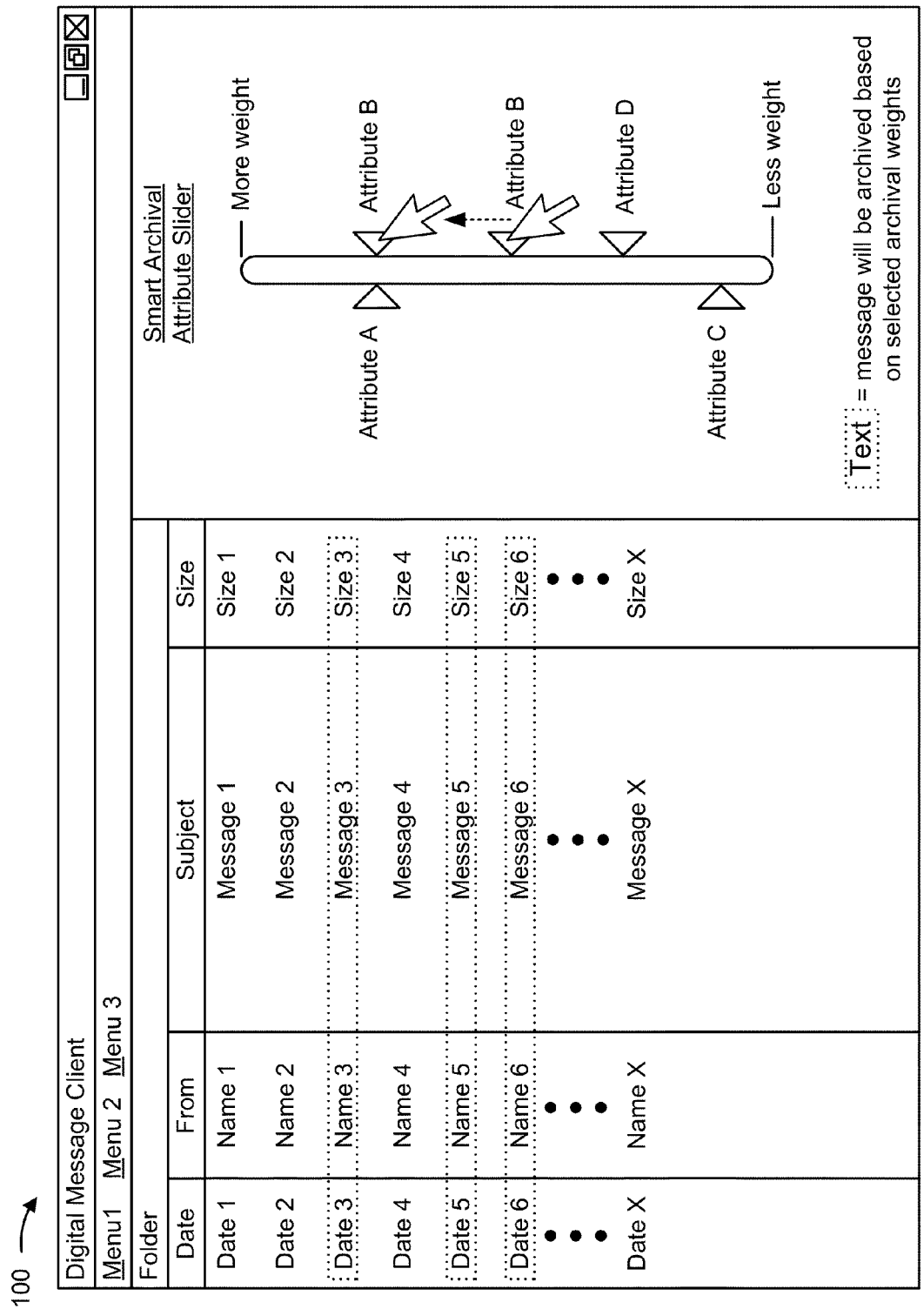
FIG. 1 is a diagram of an overview of an example implementation described herein.

FIG. 1 is a diagram of an overview of an example implementation 100 described herein. As shown in FIG. 1, assume that a user of a user device is accessing a user account associated with a digital message client. Further assume that the user account has received a number of digital messages, via the digital message client, that are stored in a memory location associated with the user account.

As shown in FIG. 1, the user may wish to archive a portion of the stored digital messages, associated with the user account, based on one or more attributes associated with the digital messages (e.g. a message size, a receipt date, etc.). For example, the user may wish to archive some of the digital messages stored by the digital message client based on Attributes A, B, C, and D associated with the digital messages, as shown.

As further shown in FIG. 1, a user may interact with a user interface, provided via the user device, to select an archival weight associated with the attributes. A selected archival weight associated with an attribute may indicate that the attribute is to be assigned more (or less) weight when determining whether a digital message is to be archived. For example, the user may select an archival weight for Attribute B by clicking and dragging an arrow, associated with Attribute B, on a slider, as shown. By clicking and dragging the arrow in a particular direction, the user may indicate that Attribute B is to be given more (or less) weight when determining whether the digital message is to be archived.

As further shown in FIG. 1, a user interface associated with the digital message client may display an indication as to whether the digital message is to be archived based on the selected archival weights associated with the attributes. For example, the user interface may highlight one or more digital messages after the user has selected archival weights associated with Attributes A-D, as shown. The user may choose to archive the highlighted digital messages. The user may also select a different archival weight for one or more of the attributes, and/or may modify the attributes to be used when determining whether a digital message is to be archived. The selected attributes and the selected archival weights may also be stored for future digital message archiving sessions. In this way, a user may customize a manner in which digital messages are archived based on preferences of the user.

Figure 2:
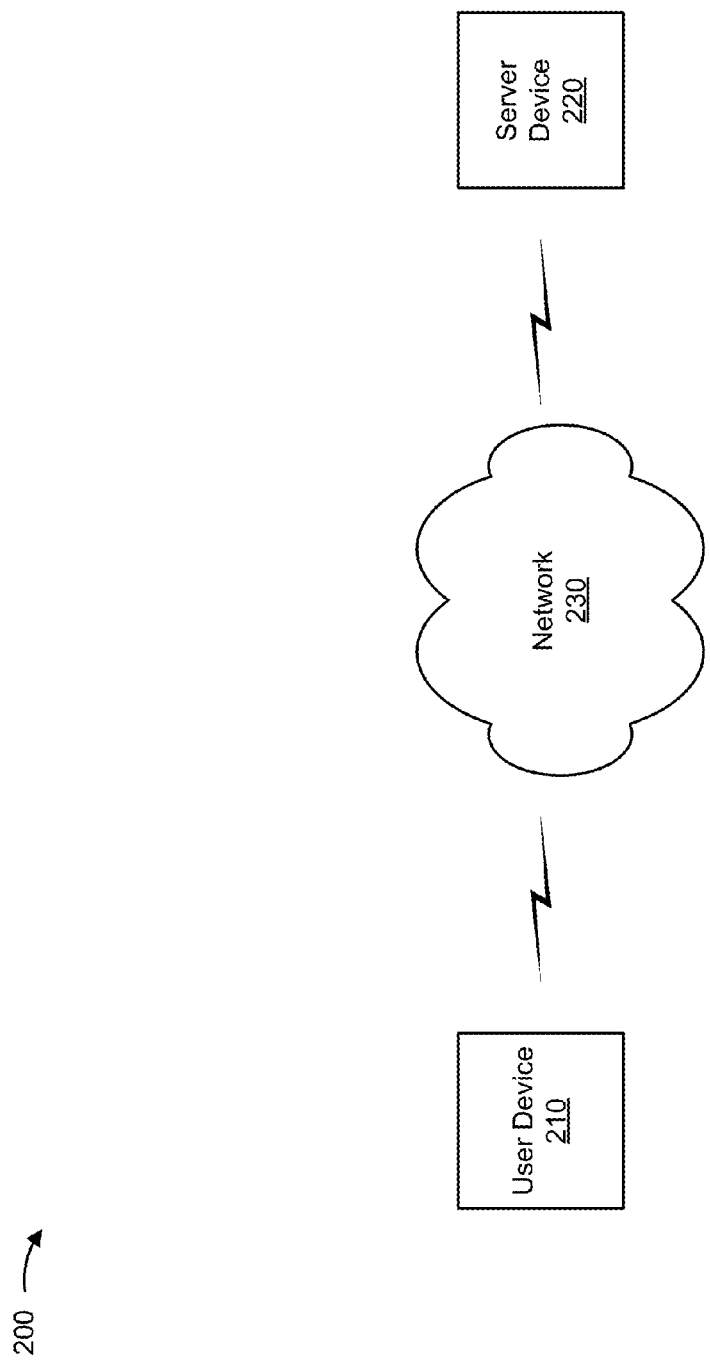
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, and a network 230.

User device 210 may include a device capable of receiving, transmitting, processing, archiving, and/or storing digital messages (e.g., email messages). For example, user device 210 may include a computing device (e.g., a laptop computer, a desktop computer, a tablet computer, etc.), a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, and/or a similar device. User device 210 may send digital messages to and/or receive digital messages from one or more other devices (e.g., via network 230).

Server device 220 may include a device, such as a server, capable of receiving, transmitting, processing, archiving, and/or storing digital messages and/or information associated with archiving digital messages. Server device 220 may host and/or execute applications and/or services, such as digital message services, and may provide such services to user device 210. For example, server device 220 may include a digital message server.

Network 230 may include one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
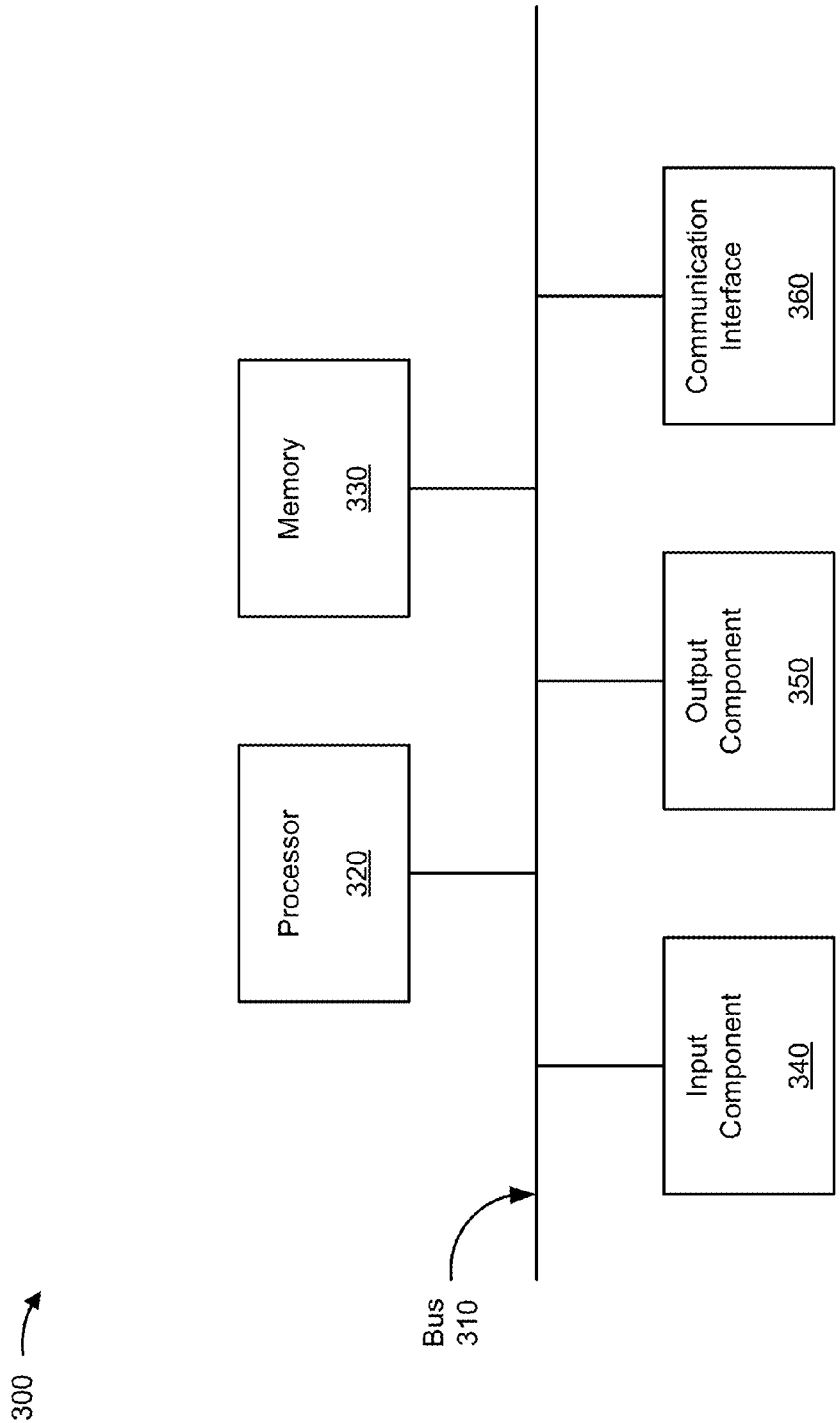
FIG. 3 is a diagram of example components of one or more devices of FIG. 2.

FIG. 3 is a diagram of example components of a device 300. Device 300 may correspond to user device 210 and/or server device 220. Additionally, or alternatively, each of user device 210 and/or server device 220 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, a direct access storage device, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3.

Figure 4:
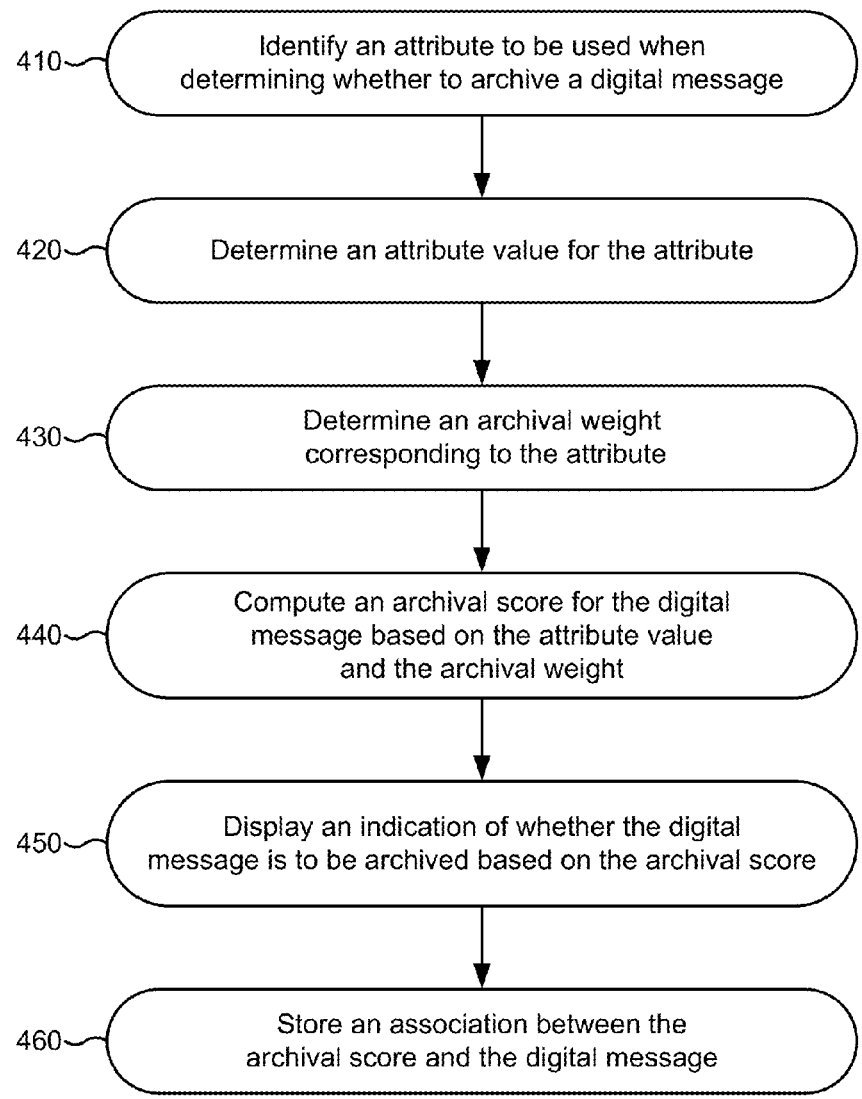
FIG. 4 is a flow chart of an example process for computing and storing an archival score for a digital message.

FIG. 4 is a flow chart of an example process 400 for computing and storing an archival score for a digital message. In some implementations, one or more process blocks of FIG. 4 may be performed by user device 210. In some implementations, one or more process blocks of FIG. 4 may be performed by another device or a group of devices separate from or including user device 210, such as server device 220.

As shown in FIG. 4, process 400 may include identifying an attribute to be used when determining whether to archive a digital message (block 410). For example, user device 210 may identify one or more attributes to be used when determining whether to archive a digital message. In some implementations, user device 210 may identify the attributes based on input from a user, provided via a user interface displayed on user device 210. Additionally, or alternatively, another device may identify the attributes (e.g., server device 220), and may transmit information that identifies the attributes to user device 210.

A digital message, as used herein, may refer to an electronic communication associated with a user (e.g., an email message, a short message service ("SMS") text message, a multimedia messaging service ("MMS") message, etc.) and/or electronic information (e.g., a file) stored on a device (e.g., user device 210, server device 220, etc.).

An attribute, as used herein, may include information that describes a characteristic of the digital message. For example, an attribute may include a date and/or time associated with the digital message (e.g., a date of receipt, a time of receipt, a date of transmission, a time of transmission, etc.), a file size of the digital message (e.g., an amount of memory space required to store the digital message, etc.), an indication of whether the digital message was flagged by a user (e.g., marked as important, etc.), an indication of a priority level associated with the digital message (e.g. high, medium, low, etc.), an indication of a thread size associated with the digital message (e.g., a number of digital messages in a string of related digital messages, a number of replies to and/or forwards of the digital message, etc.), an indication that the digital message is a response to another digital message sent by the user (e.g., whether the digital message is a reply, etc.), an identity of a sender of the digital message, an indication of whether the digital message was received from a contact of the user (e.g., a contact stored in the user's address book, a contact indicated as an important contact, etc.), an indication of whether the user is a primary recipient of the digital message (e.g., whether the user was carbon copied on the digital message, whether the user was blind carbon copied on the digital message, whether the user was a primary recipient of the digital message, etc.), an indication of whether the digital message has been opened, an indication of whether the digital message has been forwarded or replied to by the user, or the like.

Archiving, as used herein, may refer to transferring a digital message from a memory storage location on a device (e.g., user device 210) to another memory storage location on the device, transferring a digital message from a memory storage location on a device (e.g., user device 210) to a memory storage location on another device (e.g., server device 220), compressing a digital message for storage in a memory location on a device, deleting a digital message from a memory storage location on a device, or the like. Archiving a digital message may allow information associated with the digital message to be saved, preserved, and/or protected so the information may be accessed in the future. In some implementations, an attribute of a digital message may be used to determine whether to archive the digital message.

As further shown in FIG. 4, process 400 may include determining an attribute value for the attribute (block 420). For example, user device 210 may determine attribute values associated with the digital message based on the attributes to be used when determining whether to archive the digital message.

In some implementations, user device 210 may determine the attribute value by obtaining the attribute value from a memory storage location, associated with a digital message client user account, that contains the digital message and/or information associated with the digital message. The determined attribute value may include a string of characters indicating information about the digital message, (e.g., 04-03-13, 25 kB, etc.), information in the form of a logical data type (e.g., True, False, etc.), a numeric value (e.g., 0, 0.1, 0.5, 1 etc.), or the like.

In some implementations, user device 210 may determine multiple attribute values associated with the digital message, where each attribute value corresponds to an attribute to be used when determining whether to archive the digital message. In some implementations, the attribute value may be within a range of numerical values (e.g., from 0 to 1).

In some implementations, user device 210 may determine a numeric attribute value for the attribute based on a time associated with the digital message. For example, the numeric attribute value of a digital message received more than a threshold quantity of time (e.g., 60 days) prior to determining the attribute value may be 1, the numeric attribute value of a digital message received between two threshold quantities of time (e.g., between 30 and 60 days) prior to determining the attribute value may be 0.5, the numeric attribute value of a digital message received less than a threshold quantity of time (e.g., less than 30 days) prior to determining the attribute value may be 0, etc.

Additionally or alternatively, user device 210 may determine a numeric attribute value for the attribute based on a file size of the digital message. For example, the numeric attribute value of a digital message with a file size greater than or equal to a threshold size (e.g., 1 megabyte ("MB")) may be 1, the numeric attribute value of a digital message with a file size between two threshold sizes (e.g., between 200 and 299 kilobytes ("kB")) may be 0.2, etc.

Additionally or alternatively, user device 210 may determine a numeric attribute value for the attribute based on an indication of whether the digital message is (or is not) flagged by a user. For example, an indication that the digital message is not flagged by the user (e.g., False) may be given a first numeric attribute value (e.g., 1), an indication that the digital message is flagged by the user (e.g., True) may be given a second numeric attribute value (e.g., 0), etc.

Additionally or alternatively, user device 210 may determine a numeric attribute value for the attribute based on an indication of a priority level associated with the digital message. For example, an indication of a low priority digital message may given a first numeric attribute value (e.g., 1), an indication of a medium priority digital message may be given a second numeric attribute value (e.g., 0.5), an indication of a high priority digital message may given a third numeric attribute value (e.g., 0), etc.

Additionally or alternatively, user device 210 may determine a numeric attribute value for the attribute based on an indication of a thread size associated with the digital message. For example, a digital message associated with a threshold quantity of other digital messages (e.g., 0 digital messages) may be given a first numeric attribute value (e.g., 1), a digital message associated with a quantity of digital messages between two threshold quantities of digital messages (e.g., between 0 and 10 digital messages) may be given a second numeric attribute value (e.g., 0.5), a digital message associated with more than a threshold quantity of digital messages (e.g., 10 digital messages) may be given a third numeric attribute value (e.g., 0), etc.

Additionally or alternatively, user device 210 may determine a numeric attribute value for the attribute based on an indication that the digital message is (or is not) a response to another digital message sent by the user. For example, an indication that the digital message is not a reply to another digital message sent by the user (e.g., False) may be given a first numeric attribute value (e.g., 1), an indication that the digital message is a reply to another digital message sent by the user (e.g., True) may be given a second numeric attribute value (e.g., 0), etc.

Additionally or alternatively, user device 210 may determine a numeric attribute value for the attribute based on an indication of whether the digital message was received from a contact of the user. For example, an indication that the digital message was sent from another user that is not identified as a contact in the user's address book (e.g., False) may be given a first numeric attribute value (e.g., 1), an indication that the digital message was sent from another user that is identified as contact in the user's address book (e.g., True) may be given a second numeric attribute value (e.g., 0), etc.

Additionally or alternatively, user device 210 may determine a numeric attribute value for the attribute based on an indication that the user is (or is not) a primary recipient of the digital message. For example, an indication that the user is carbon copied on the digital message (e.g., False) may be given a first numeric attribute value (e.g., 1), an indication that the user is a primary recipient of the digital message (e.g., True) may be given a second numeric attribute value (e.g., 0), etc.

Additionally or alternatively, user device 210 may determine a numeric attribute value for the attribute based on an indication that the user has (or has not) opened the digital message. For example, an indication that the user has opened the digital message (e.g., True) may be given a first numeric attribute value (e.g., 1), an indication that the user has not opened the digital message (e.g., False) may be given a second numeric attribute value (e.g., 0), etc.

Additionally or alternatively, user device 210 may determine a numeric attribute value for the attribute based on an indication that the user has forwarded or replied to the digital message. For example, an indication that the user has not forwarded the digital message (e.g., False) may be given a first numeric attribute value (e.g., 1), an indication that the user has forwarded the digital message (e.g., True) may be given a second numeric attribute value (e.g., 0), etc. Similarly, an indication that the user has not replied to the digital message (e.g., False) may be given a first numeric attribute value (e.g., 1), an indication that the user has replied to the digital message (e.g., False) may be given a second numeric attribute value (e.g., 0), etc.

The above thresholds are provided as an example. User device 210 may assign a numeric attribute value to an attribute of a digital message based on the attribute value of the attribute matching a value (e.g., True, False), satisfying a threshold (e.g., being greater than or less than a threshold value), satisfying multiple thresholds (e.g., being between two threshold values), etc.

As further shown in FIG. 4, process 400 may include determining an archival weight corresponding to the attribute (block 430). For example, user device 210 may determine an archival weight associated with the attribute based on input from the user, provided via a user interface displayed on user device 210. The archival weight may indicate a weight that is to be applied to the attribute value when determining whether the digital message is to be archived. For example, the archival weight may include a number, which may be combined with the attribute value to generate an archival score for a digital message. In some implementations, the archival weight associated with the attribute may be within a range of numerical values (e.g., from 0 to 10, from 0 to 1, from −1 to 1, etc.).

In some implementations, the archival weight may be determined based on input from the user, provided via a user interface displayed on user device 210, associated with a range of numerical values. For example, a slider, associated with the digital message client, may allow the user to interact with an input mechanism (e.g., an arrow) corresponding to the attribute to indicate an archival weight, within a range of numerical values (e.g., from 0 to 10), that is to be associated with the attribute (e.g., the user may click and drag an arrow associated with an attribute to indicate that a weight of 3 is to be a applied to the attribute). In some implementations, the input mechanism may include a mechanism other than a slider (e.g., a dropdown box, a text box, a checkbox, etc.).

As further shown in FIG. 4, process 400 may include computing an archival score for the digital message based on the attribute value and the archival weight (block 440). For example, user device 210 may compute the archival score based on the attribute value, associated with the attribute, and the archival weight, associated with the attribute. In some implementations, user device 210 may calculate the archival score using an algorithm based on the attribute value and the archival weight. For example, the archival weight may be a coefficient multiplied with the attribute value. The products of each of the attribute values and the corresponding archival weights may be combined (e.g., summed) to generate the archival score. The archival score may indicate whether the digital message is (or is not) to be archived.

In some implementations, an archival score that satisfies a threshold may indicate that the digital message, associated with the archival score, is to be archived. For example, the archival score computed by user device 210 may satisfy a threshold (e.g., a numerical value). In some implementations, when the archival score satisfies the threshold, user device 210 may archive the digital message.

As further shown in FIG. 4, process 400 may include displaying an indication of whether the digital message is to be archived based on the archival score (block 450). For example, user device 210 may display an indication that the digital message is (or is not) to be archived. In some implementations, the indication may include flagging the digital message, on the display screen of user device 210, to indicate that the digital message is to be archived. Additionally, or alternatively, the text associated with the digital message, displayed on a display screen of user device 210, may be modified to indicate that the digital message is to be archived (e.g., highlighted, bolded, changed to a different color, etc.).

Additionally, or alternatively, user device 210 may display an indication associated with the total number of digital messages that are to be archived based on the archival scores for each digital message. Additionally, or alternatively, user device 210 may display information that identifies a total amount of memory space of the digital messages that are to be archived (e.g., an amount of memory space to become available when the digital messages are archived). Additionally, or alternatively, user device 210 may display an indication associated with a particular time that the digital messages are to be archived (e.g., a running countdown timer indicating when the digital messages will be archived, a number of days until the digital messages will be archived, etc.).

In some implementations, user device 210 may display an indication associated with an order and/or a priority for archiving the digital messages. For example, user device 210 may display an indication indicating an order and/or priority in which digital messages are to be archived by using numerical values (e.g., 1, 2, 3, etc.) to indicate the order in which the digital messages will be archived. As another example, user device 210 may display an indication indicating the order and/or priority by modifying text associated with the digital messages (e.g., using different colors to indicate which digital messages will be archived first, second, third, etc.).

In some implementations, after the indication whether the digital message is to be archived has been displayed on user device 210, the user may select a different archival weight for one or more of the attributes, and/or may modify the attributes used to determine whether the digital message may be archived. The user may also remove one or more digital messages from the group of digital messages that may be archived. In this way, user device 210 may identify a particular message for archival, but the user may prevent the message from being archived (e.g., based on identifying the message, based on identifying an attribute of messages not to be archived, etc.). User device 210 may compute an updated archival score based on the different archival weights and/or modified attributes in the same manner discussed above. User device 210 may update the indication displayed on user device 210 based on the updated archival score.

As further shown in FIG. 4, process 400 may include storing an association between the archival score and the digital message (block 460). For example, user device 210 may store the association (e.g., in a data structure). The association may identify the archival score indicating whether the digital message is to be archived. In some implementations, user device 210 may store information associated with the digital message, such as a digital message identifier of the digital message (e.g., a string of characters associated with a digital message), an attribute associated with the digital message (e.g., a receipt date and/or receipt time of the digital message, a file size of the digital message, etc.), an attribute value associated with the digital message archival score, an archival weight associated with the digital message, an archival score associated with the digital message, or the like.

While a series of blocks has been described with regard to FIG. 4, the blocks and/or the order of the blocks may be modified in some implementations. Additionally, or alternatively, non-dependent blocks may be performed in parallel. Further, one or more blocks may be omitted.

Figure 5A:
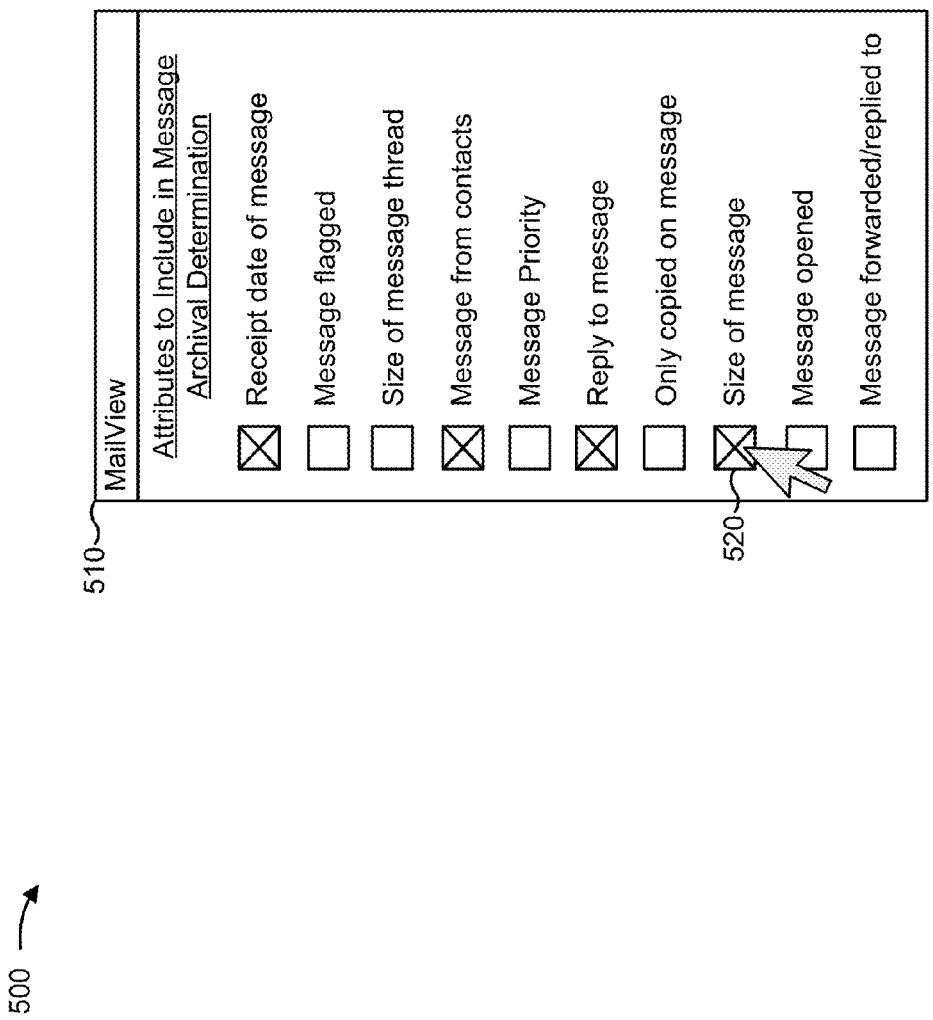
FIGS. 5A-5C are diagrams of an example implementation relating to the example process shown in FIG. 4.
Figure 5B:
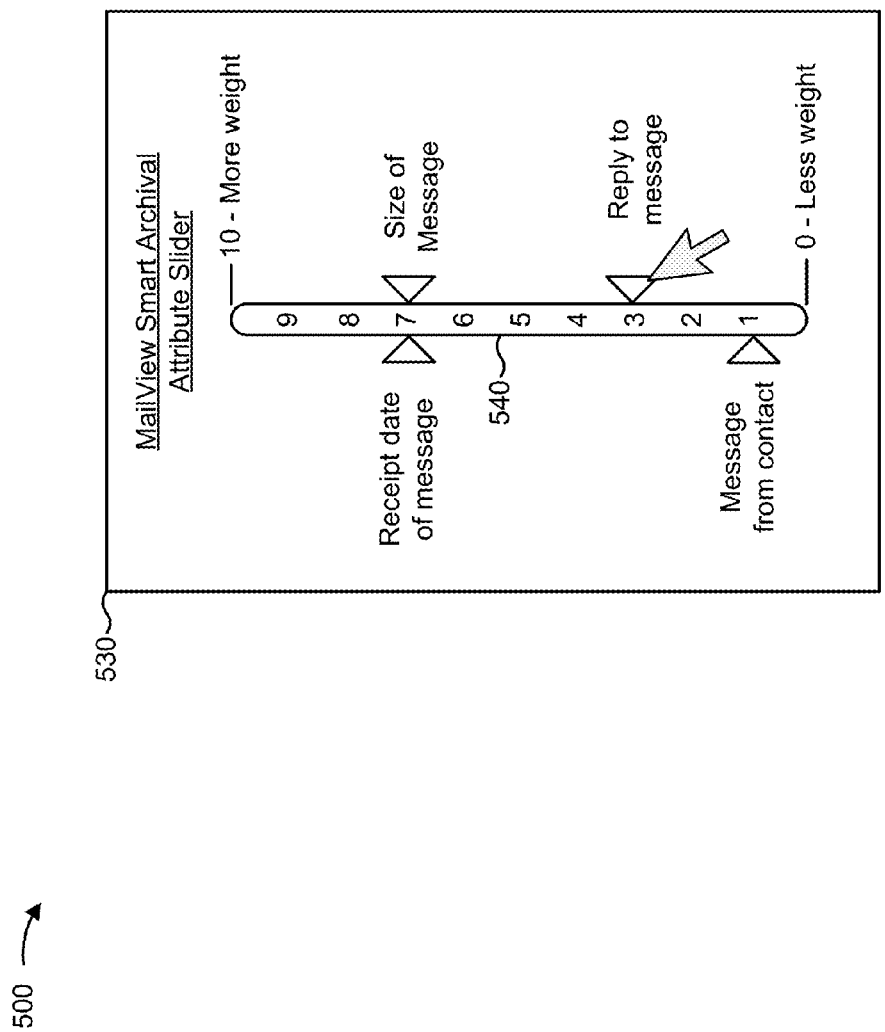
Figure 5C:
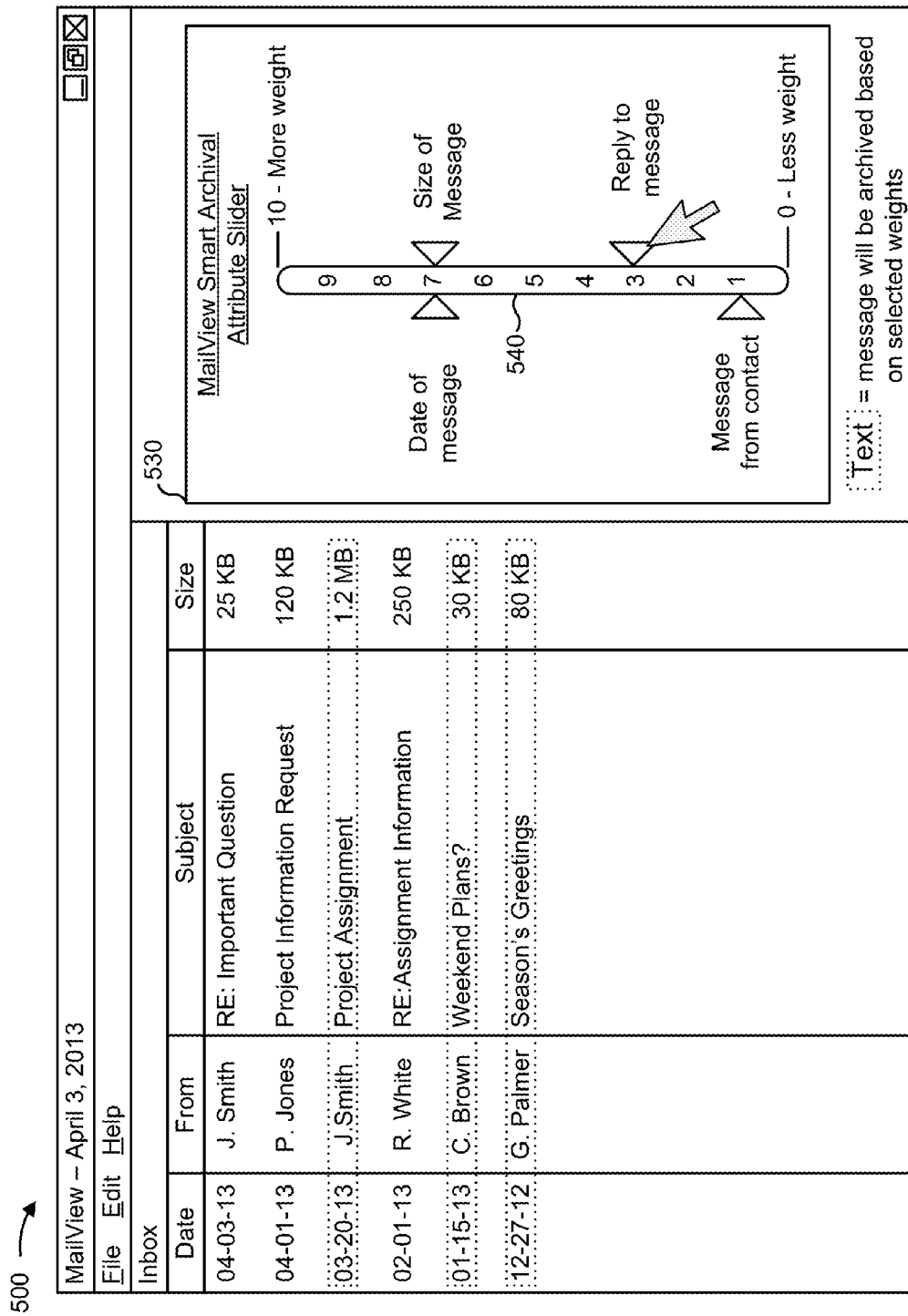

FIGS. 5A-5C are diagrams of an example implementation 500 relating to example process 400 shown in FIG. 4. As shown in FIG. 5A, example implementation 500 may include receiving user input to identify attributes to be used when determining whether to archive a digital message.

As shown in FIG. 5A, a user may interact with a user interface 510, provided on a display of user device 210, to specify one or more attributes to be used when determining whether to archive a digital message. For example, a user may interact (e.g., by touching, clicking, etc.) with one or more input elements (e.g., a checkbox, a menu item, etc.) on user interface 510, as shown by reference number 520, to specify attributes to be used when determining whether to archive a digital message associated with a MailView digital message client. For example, the user of user device 210 may interact with user interface 510 by checking boxes indicating that a receipt date of the digital message, an indication of whether the digital message was received from a contact of the user, an indication of whether the digital message is a reply to another digital message sent by the user, and a file size of the digital message are the attributes to be used when determining whether to archive the digital message.

User device 210 may determine attribute values of the specified attributes by obtaining information, associated with each of the specified attributes, from a memory storage location associated with the digital message and/or the attributes. In example implementation 500, assume that the attribute values of the digital message are determined based on the attributes, and include a numerical representation of the attributes associated with the digital message. Further, assume that there are four attribute values associated with the digital message, and the attribute values are numerical values ranging from 0 to 1.

As shown in FIG. 5B, a user may interact with a user interface 530, provided on a display of user device 210, to specify archival weights for the attributes. For example, a user may interact (e.g., by touching, clicking, dragging, etc.) with one or more input elements (e.g., an arrow, a slider, etc.) on a portion of user interface 530 (e.g., a numerical scale), as shown by reference number 540, to specify archival weights for the attributes. The specified archival weights may indicate a weight to be applied to the attribute values when determining whether to archive the digital message. For example, a user of user device 210 may interact with user interface 530 by clicking and dragging arrows along a scale, ranging from 0 to 10, to indicate that an archival weight of 7 will be applied to the attribute value of the receipt date of the digital message, an archival weight of 1 will be applied to the attribute value of the indication of whether the digital message was received from a contact of the user, an archival weight of 3 will be applied to the attribute value of the indication of whether the digital message is a reply to another digital message sent by the user, and an archival weight of 7 will be applied to the attribute value of the size of the digital message when determining whether the digital message is to be archived, as shown.

User device 210 may compute an archival score for the digital message using an algorithm based on the attribute values and the archival weights. In example implementation 500, assume that archival weights are coefficients multiplied with attribute values, and the products are summed to generate the archival score. The archival score may indicate whether the digital message is (or is not) to be archived. In example implementation 500, assume that if the archival score for the digital message satisfies a threshold value of 10, then user device 210 may archive the digital message.

As shown in FIG. 5C, a user interface 550, provided on a display of user device 210, may display an indication of whether a digital message is to be archived. The indication may include highlighting text, associated with the digital message, on MailView user interface 550. For example, assume that the archival scores of three digital messages (e.g., the 03-20-13 digital message from J. Smith, the 01-15-13 digital message from C. Brown, and the 12-27-12 digital message from G. Palmer), located in the MailView Inbox, satisfy the threshold value and may be archived. As shown, text associated with the 03-20-13 digital message from J. Smith, text associated with the 01-15-13 digital message from C. Brown, and text associated with the 12-27-12 digital message from G. Palmer have been surrounded by a series of dots on user interface 550 to indicate that the three digital messages are to be archived.

As indicated above, FIGS. 5A-5C are provided merely as an example. Other examples are possible and may differ from what was described with regard to FIGS. 5A-5C.

FIG. 6 is a diagram of an example of a data structure 600 that stores attribute values, archival weights, and archival scores associated with digital messages. Data structure 600 may be stored in a memory device (e.g., a RAM, a hard disk, a digital access storage device, etc.) associated with one or more devices and/or components shown in FIGS. 2 and/or 3. For example, data structure 600 may be stored by user device 210 and/or server device 220.

Data structure 600 may include a collection of fields, such as a digital message identifier field 605, one or more fields corresponding to attributes of a digital message (e.g., a receipt date field 610, a contact field 625, a reply field 640, a size field 655, etc.), one or more fields corresponding to the attribute values of the attributes (e.g., a receipt date value field 615, a contact value field 630, a reply value field 645, a size value field 660, etc.), one or more fields corresponding to archival weights of the attributes (e.g., a receipt date weight field 620, a contact weight field 635, a reply weight field 650, a size weight field 665, etc.), an archival score field 670, or the like.

Digital message identifier ("ID") field 605 may store information that identifies a digital message. For example, the digital message identifier may include a string of characters associated with the digital message, such as a string of characters that includes the date of receipt of the digital message and the sender of the digital message (e.g., 040113-pjones) or any other string of characters that uniquely identifies the digital message.

Receipt date field 610 may store information that identifies a receipt date of the digital message identified in digital message ID field 605. For example, receipt date field 610 may store a time stamp that identifies a receipt date (e.g., 04-01-13) of the digital message, a receipt time of the digital message, etc.

Receipt date value field 615 may store information that identifies the attribute value of the receipt date identified in receipt date field 610. For example, receipt date value field 615 may store a numerical value (e.g., ranging from 0 to 1) based on the receipt date of the digital message.

Receipt date weight field 620 may store information that identifies the archival weight to be applied to the receipt date value identified in receipt date value field 615. For example, receipt date weight field 620 may store a numerical value (e.g., ranging from 0 to 10).

Contact field 625 may store an indication that a sender of the digital message, identified in digital message ID field 605, is (or is not) a contact of the user (e.g., a contact identified in an address book of the user, etc.). For example, contact field 625 may store an indication that a sender of the digital message is not a contact of the user using a numeric value (e.g., 0 or 1) or a logical data type (e.g., False). As another example, contact field 625 may store an indication that a sender of the digital message is a contact of the user using a numeric value (e.g., 0 or 1) or a logical data type (e.g., True).

Contact value field 630 may store information that identifies the attribute value of the indication identified in contact field 625. For example, contact value field 630 may store a numerical value (e.g., ranging from 0 to 1) based on the indication stored in contact field 625.

Contact weight field 635 may store information that identifies the archival weight to be applied to the contact value identified in contact value field 630. For example, contact weight field 635 may store a numerical value (e.g., ranging from 0 to 10).

Reply field 640 may store an indication that the digital message, identified in digital message ID field 605, is (or is not) a reply to another digital message sent by the user. For example, reply field 640 may store an indication that the digital message is not a reply to another message sent by the user using a numeric value (e.g., 0 or 1) or a logical data type (e.g., False). As another example, reply field 640 may store an indication that the digital message is a reply to another message sent by the user using a numeric value (e.g., 0 or 1) or a logical data type (e.g., True).

Reply value field 645 may store information that identifies the attribute value of the indication identified in reply field 640. For example, reply value field 645 may store a numerical value (e.g., ranging from 0 to 1) based on the indication stored in reply field 640.

Reply weight field 650 may store information that identifies the archival weight to be applied to the reply value identified in reply value field 645. For example, reply weight field 650 may store a numerical value (e.g., ranging from 0 to 10).

Size field 655 may store information that identifies a size of the digital message identified in digital message ID field 605. For example, size field 655 may store a string of characters indicating the quantity of memory space required to store the message (e.g., 120 kB), etc.

Size value field 660 may store information that identifies the attribute value of the size identified in size field 655. For example, size value field 660 may store a numerical value (e.g., ranging from 0 to 1) based on the size of the digital message.

Size weight field 665 may store information that identifies the archival weight to be applied to the size value identified in size value field 660. For example, size weight field 665 may store a numerical value (e.g., ranging from 0 to 10).

Archival score field 670 may store information that identifies an archival score computed for the digital message identified in digital message ID field 605. For example, archival score field 670 may store a numerical value (e.g., 4.84) that is based on receipt date value field 615, receipt date weight field 620, contact value field 630, contact weight field 635, reply value field 645, reply weight field 650, size value field 660, and size weight field 665.

Information associated with a digital message may be conceptually represented as a single column in data structure 600. For example, as shown in FIG. 6, the second column in data structure 600 may correspond to the computation of an archival score for a digital message identified as "040113-pjones."

Assume that the receipt date value is a numerical value ranging from 0 to 1. Further, assume that the receipt date value of a digital message received on the same date as the receipt date value is determined is 0, and that the receipt date value of a digital message received 90 days (or more) prior to the date the receipt date value is determined is 1. Further, assume that the receipt date value for a digital message received 1 to 89 days prior to the date the receipt date value is determined by dividing the number of days since receipt by 90 days (e.g., 30 days since receipt divided by 90 days yields a receipt date value of 0.33). Finally, assume that the receipt date value is determined on 04-03-13. Based on these assumptions, the receipt date value of the "040113-pjones" digital message is 0.02 (e.g., 2 days since receipt divided by 90 days yields a receipt date value of 0.02). A receipt date weight of 7 is to be applied to the receipt date value based on user input provided via the slider displayed on user device 210.

Assume that the contact value of a digital message is either 0 or 1. Further, assume that the contact value of a digital message that is not from a contact of the user is 1, and the contact value of a digital message that is from a contact of the user is 0. Based on these assumptions, the contact value of the "040113-pjones" digital message is 1 (e.g., the indication whether the digital message is from a contact of the user is "False"). A contact weight of 1 is to be applied to the contact value based on user input provided via the slider displayed on user device 210.

Assume that the reply value of a digital message is either 0 or 1. Further, assume that the reply value of a digital message that is not a reply to another message sent by the user is 1, and the reply value of a digital message that is a reply to another message sent by the user is 0. Based on these assumptions, the reply value of the "040113-pjones" digital message is 1 (e.g., the indication whether the digital message is a reply to another message sent by the user is "False"). A reply weight of 3 is to be applied to the reply value based on user input provided via the slider displayed on user device 210.

Assume that the size value is a numerical value ranging from 0 to 1. Further, assume that the size value of a digital message with a size from 0 kB to 99 kb is 0, the size value of a digital message with a size from 100 kB to 199 kB is 0.1, and so forth. Finally, assume that the size value of a digital message with a size of 1 MB (or more) is 1. Based on these assumptions, the size value of the "040113-pjones" digital message is 0.1 (e.g., the 120 kB size of the digital message is between 100 kB and 199 kB). A size weight of 7 is to be applied to the size value based on user input provided via the slider displayed on user device 210.

User device 210 may compute the archival score based on the attribute values and archival weights of the digital message. In this instance, the archival weights are multiplied with corresponding attribute values, and the products may be summed to generate the archival score equaling 4.84 (e.g., (0.02×7)+(1×1)+(1×3)+(0.1×7)=4.84).

Data structure 600 includes fields 605-670 for explanatory purposes. In practice, data structure 600 may include additional fields, fewer fields, different fields, or differently arranged fields than those illustrated in FIG. 6 and/or described herein with respect to data structure 600. Furthermore, while data structure 600 is represented as a table with rows and columns, in practice, data structure 600 may include any type of data structure, such as a linked list, a tree, a hash table, a database, or any other type of data structure. In some implementations, data structure 600 may include information generated by a device and/or component. Additionally, or alternatively, data structure 600 may include information provided from another source, such as information provided by a user and/or information automatically provided by a device.

Figure 7:
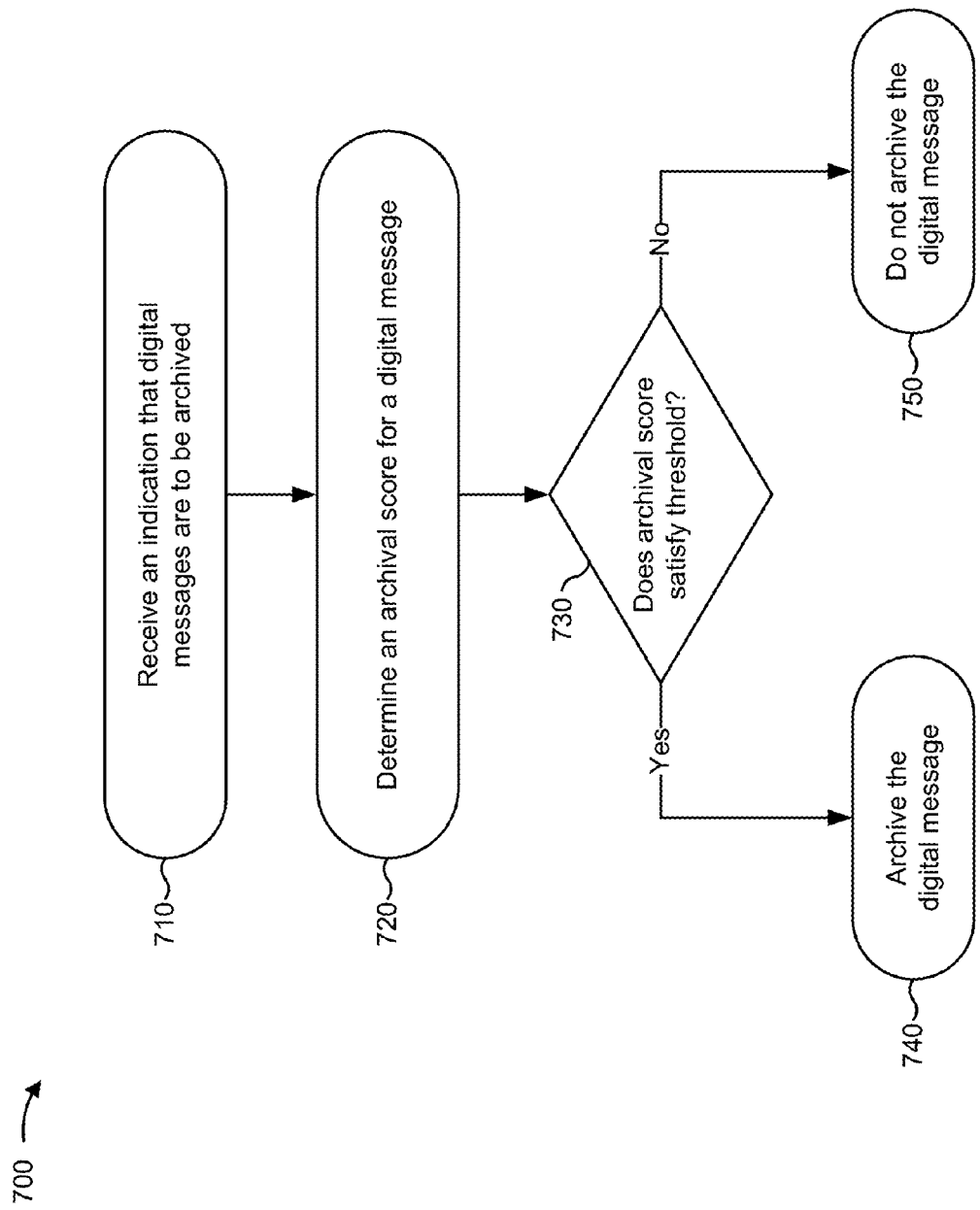
FIG. 7 is a flow chart of an example process for archiving digital messages based on an archival score.

FIG. 7 is a flow chart of an example process 700 for archiving digital messages based on an archival score. In some implementations, one or more process blocks of FIG. 7 may be performed by user device 210. In some implementations, one or more process blocks of FIG. 7 may be performed by another device or a group of devices separate from or including user device 210, such as server device 220.

As shown in FIG. 7, process 700 may include receiving an indication that digital messages are to be archived (block 710). For example, user device 210 may determine that digital messages, associated with a digital message client, are to be archived. In some implementations, user device 210 may determine that digital messages are to be archived based on user input, provided via a user interface, and received by user device 210.

In some implementations, user device 210 may determine that digital messages are to be archived based on a particular time (e.g., an indication that digital messages are to be archived on a particular date, an indication that digital messages are to be archived at a particular time, an indication that digital messages are to be archived at a particular time interval, etc.), based on memory space (e.g., when available memory space becomes 80% full, etc.), based on user input (e.g., a user providing input to archive digital messages, etc.), or the like.

As further shown in FIG. 7, process 700 may include determining an archival score for a digital message (block 720). For example, user device 210 may determine the archival score for the digital message based on receiving the indication. In some implementations, user device 210 may determine the archival score for the digital message based on information associated with the digital message. For example, user device 210 may determine the archival score for the digital message by determining the archival score, associated with the digital message, stored in a data structure (e.g., data structure 600). Additionally, or alternatively, user device 210 may compute the archival score based on, for example, an attribute value and an archival weight associated with the digital message.

As further shown in FIG. 7, process 700 may include determining whether the archival score satisfies a threshold (block 730). For example, user device 210 may determine whether the archival score for the digital message satisfies a threshold. In some implementations, the threshold may be associated with the digital message client. For example, the user of user device 210 may provide, via a user interface associated with the digital message client, information that identifies a threshold that is to be used when determining whether to archive the digital message. Additionally, or alternatively, the threshold may be provided to user device 210 by another device associated with the digital message client, such as server device 220. Additionally, or alternatively, the threshold may be preset by the digital message client.

In some implementations, the threshold may indicate whether the digital message is to be archived. For example, if the archival score satisfies the threshold, then user device 210 may archive the digital message. Additionally, or alternatively, if the archival score does not satisfy the threshold, then user device 210 may not archive the digital message. In some implementations, the threshold may include a numerical value (e.g., 10).

As further shown in FIG. 7, if the archival score satisfies the threshold (block 730—YES), then process 700 may include archiving the digital message (block 740). For example, user device 210 may determine that the archival score associated with the digital message satisfies the threshold, based on information stored in a data structure (e.g., data structure 600). Based on the determination, user device 210 may archive the digital message.

In some implementations, the digital messages may be ordered and/or prioritized for archiving based on the archival scores associated with the digital messages (e.g., the digital message with the highest archival score may be archived first, the digital message with the lowest archival score may be archived last, etc.). The digital messages may be archived in the prioritized order until some criteria is met, such as a particular quantity of digital messages being archived (or not archived), a threshold quantity of memory space becoming available, etc.

In some implementations, user device 210 may archive the digital message in a memory location associated with user device 210. Additionally, or alternatively, the digital message may be archived in a memory storage location associated with the digital message client, such as a memory storage location of user device 210 or server device 220.

As further shown in FIG. 7, if the archival score does not satisfy the threshold (block 730—NO), then process 700 may include not archiving the digital message (block 750). For example, user device 210 may determine that the archival score associated with the digital message does not satisfy the threshold, based on information stored in a data structure (e.g., data structure 600). Based on the determination, user device 210 may not archive the digital message. Not archiving the digital message, as used herein, may refer to the digital message remaining in the memory storage location associated with the digital message (e.g., no changes are made to the digital message or the memory storage location associated with the digital message).

While a series of blocks has been described with regard to FIG. 7, the blocks and/or the order of the blocks may be modified in some implementations. Additionally, or alternatively, non-dependent blocks may be performed in parallel. Further, one or more blocks may be omitted.

Figure 8:
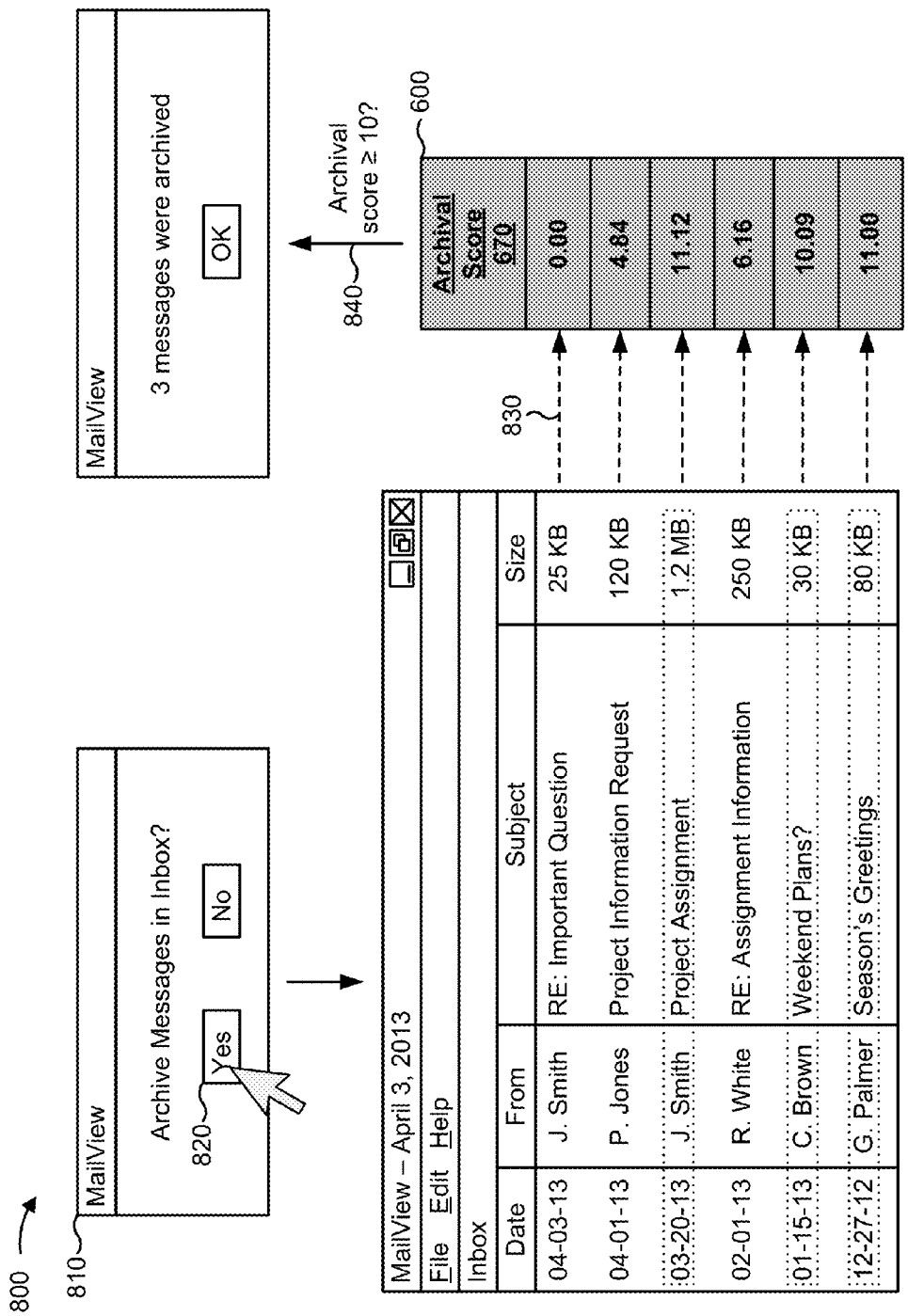
FIG. 8 is a diagram of an example implementation relating to the example process shown in FIG. 7.

FIG. 8 is a diagram of an example implementation 800 relating to example process 700 shown in FIG. 7. As shown in FIG. 8, example implementation 800 may include determining that a digital message is to be archived based on an archival score, and archiving the digital message.

As shown in FIG. 8, a user may interact with a user interface 810, provided on a display of user device 210, to indicate that digital messages are to be archived. For example, a user may interact (e.g., by clicking, etc.) with an input element (e.g., a button, etc.) on user interface 810, as shown by reference number 820, to indicate that digital messages, associated with a MailView digital message client, are to be archived. As shown, the user of user device 210 may interact with the user interface, by clicking a "Yes" button, to indicate that digital messages located in a MailView Inbox are to be archived.

As shown by reference number 830, user device 210 may determine an archival score 670 associated with one or more digital messages. For example, user device 210 may determine the archival scores associated with the six digital messages located in the MailView Inbox. The determination of the archival scores may be based on information stored in data structure 600, as shown. In example implementation 800, the archival scores for the digital messages are a numerical value (e.g., 0.00, 4.84, 11.12, 6.16, 10.09, 11.00), as shown.

As shown by reference number 840, user device 210 may determine whether the archival scores, associated with the digital messages, satisfy a threshold. For example, user device 210 may determine, based on a threshold value of 10 (e.g., a threshold provided to user device 210 by a MailView server (not shown), etc.), that three of the six digital messages located in the MailView Inbox (e.g., the 03-20-13 digital message from J. Smith with an archival score of 11.12, the 01-15-13 digital message from C. Brown with an archival score of 10.09, and the 12-27-12 digital message from G. Palmer with an archival score of 11.00) satisfy the threshold. User device 210 archives the three digital messages associated with the archival scores that satisfy the threshold, as shown. User device 210 does not archive the remaining three digital messages (e.g., the 04-03-13 digital message from J. Smith with an archival score of 0.00, the 04-01-13 digital message from P. Jones with an archival score of 4.84, and the 02-01-13 digital message from R. White with an archival score of 6.16).

As indicated above, FIG. 8 is provided merely as an example. Other examples are possible and may differ from what was disclosed with regard to FIG. 8.

Implementations described herein may assist a user in archiving digital messages based on customized user preferences.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

Also, certain values and ranges of values have been described herein. These values and ranges are intended as examples. In some implementations, different values and ranges may be used.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
    one or more processors to:
        receive information identifying an attribute to be used when determining whether to archive a digital message,
            the attribute being associated with the digital message;
        determine an attribute value, for each of a plurality of digital messages, based on the attribute and a respective digital message of the plurality of digital messages;
        provide a user interface for adjusting an archival weight value corresponding to the attribute while the user interface displays the plurality of digital messages,
            the user interface including a visual representation of the archival weight value;
        receive user input, via the user interface, that adjusts the archival weight value corresponding to the attribute;
        compute an archival score, for each of the plurality of digital messages, based on combining the attribute value and the archival weight value,
            the archival score being adjusted based on the archival weight value being adjusted via the user interface;
        provide an indication, in the user interface, that identifies which digital messages, of the plurality of digital messages, will be archived based on whether the archival score for each of the plurality of digital messages satisfies a threshold,
            the indication, in the user interface, being adjusted based on the archival weight value being adjusted via the user interface; and
        archive digital messages associated with archival scores that satisfy the threshold.

2. The device of claim 1, where the one or more processors, when receiving the information identifying the attribute to be used when determining whether to archive the digital message, are to:
    receive user input, via the user interface, that selects the attribute to be used to compute the archival score from among a plurality of attributes; and
    identify the attribute based on the user input that selects the attribute.

3. The device of claim 1, where the attribute identifies at least one of:
    a date of receipt associated with the digital message;
    a time of receipt associated with the digital message;
    an indication of whether the digital message has been flagged;
    a priority level associated with the digital message;
    a thread size associated with the digital message;
    an indication of whether the digital message is a response to another digital message;
    an identity of a sender of the digital message;
    an indication of whether the digital message was received from a contact;
    an indication of whether a user that received the digital message was a primary recipient of the digital message;
    an indication of whether the digital message has been opened;
    an indication of whether the digital message has been forwarded; or
    an indication of whether the digital message has been replied to.

4. The device of claim 1, where the one or more processors, when computing the archival score, are to:
compute the archival score by treating the archival weight value as a coefficient of the attribute value.

5. The device of claim 1, where the one or more processors are further to:
store an association between the archival score and the respective digital message; and
determine that the archival score satisfies the threshold based on the association.

6. The device of claim 1, where the one or more processors are further to:
receive another user input indicating that the digital messages associated with archival scores that satisfy the threshold are to be archived; and
where the one or more processors, when archiving the digital message, are further to:
archive the digital message based on receiving the other user input.

7. The device of claim 1, where the visual representation of the archival weight value includes a slider, and
where the archival weight value is adjusted based on moving a portion of the slider.

8. A non-transitory computer-readable medium storing instructions, the instructions comprising:
one or more instructions that, when executed by a processor, cause the processor to:
identify a plurality of attributes to be used when determining whether to archive a digital message,
the plurality of attributes being associated with the digital message;
determine attribute values corresponding to the plurality of attributes;
provide a user interface for adjusting archival weight values corresponding to the plurality of attributes while the user interface displays the digital message,
the user interface including a visual representation of the archival weight values;
receive user input, via the user interface, that adjusts at least one archival weight value, of the archival weight values, corresponding to an attribute, of the plurality of attributes;
calculate an archival score for the digital message based on the attribute values and the archival weight values,
the archival score being adjusted based on the at least one archival weight value being adjusted via the user interface;
provide an indication, in the user interface, that identifies whether the digital message will be archived based on whether the archival score satisfies a threshold,
the indication, in the user interface, being adjusted based on the at least one archival weight value being adjusted via the user interface; and
archive the digital message based on determining that the archival score satisfies the threshold.

9. The non-transitory computer-readable medium of claim 8, where the one or more instructions, that cause the processor to identify the plurality of attributes to be used when determining whether to archive the digital message, cause the processor to:
receive user input, via the user interface, that selects the plurality of attributes; and
identify the plurality of attributes based on the user input that selects the plurality of attributes.

10. The non-transitory computer-readable medium of claim 8, where the plurality of attributes include at least two of:
a date of receipt associated with the digital message;
a time of receipt associated with the digital message;
an indication of whether the digital message has been flagged;
a priority level associated with the digital message;
a thread size associated with the digital message;
an indication of whether the digital message is a response to another digital message;
an identity of a sender of the digital message;
an indication of whether the digital message was received from a contact;
an indication of whether a user that received the digital message was a primary recipient of the digital message;
an indication of whether the digital message has been opened;
an indication of whether the digital message has been forwarded; or
an indication of whether the digital message has been replied to.

11. The non-transitory computer-readable medium of claim 8, where the one or more instructions, that cause the processor to calculate the archival score for the digital message based on the attribute values and the archival weight values, cause the processor to:
calculate the archival score based on products of the archival weight values and the attribute values.

12. The non-transitory computer-readable medium of claim 8, where the one or more instructions further cause the processor to:
store an association between the archival score and the digital message; and
determine that the archival score satisfies the threshold based on the association.

13. The non-transitory computer-readable medium of claim 8, where the one or more instructions further cause the processor to:
receive user input indicating that the digital message is to be archived; and
where the one or more instructions, that cause the processor to archive the digital message, cause the processor to:
archive the digital message based on receiving the user input indicating that the digital message is to be archived.

14. The non-transitory computer-readable medium of claim 8,
where the visual representation of the archival weight values includes a slider, and
where the at least one archival weight value is adjusted based on moving a portion of the slider.

15. A method, comprising:
determining, by a device, an attribute to be used when determining whether to archive a digital message,
the attribute being a characteristic of the digital message;
identifying, by the device, an attribute value associated with the attribute and the digital message;
providing, by the device, a user interface for adjusting an archival weight value corresponding to the attribute while the user interface displays the digital message,
the user interface including a visual representation of the archival weight value;
receiving, by the device, user input via the user interface that adjusts the archival weight value corresponding to the attribute;
computing, by the device, an archival score for the digital message based on combining the attribute value and the archival weight value, the archival score being adjusted based on the archival weight value being adjusted via the user interface;

providing, by the device, an indication in the user interface that identifies whether the digital message will be archived based on whether the archival score satisfies a threshold, the indication, in the user interface, being adjusted based on the archival weight value being adjusted via the user interface; and archiving, by the device, the digital message based on a determination that the archival score satisfies the threshold.

16. The method of claim 15, where determining the attribute to be used when determining whether to archive the digital message comprises:

receiving user input, via the user interface, that identifies the attribute; and determining the attribute based on the user input that identifies the attribute.

17. The method of claim 15, where the attribute includes at least one of:

a date of receipt associated with the digital message;
a time of receipt associated with the digital message;
an indication of whether the digital message has been flagged;
a priority level associated with the digital message;
a thread size associated with the digital message;
an indication of whether the digital message is a response to another digital message;
an identity of a sender of the digital message;
an indication of whether the digital message was received from a contact;
an indication of whether a user that received the digital message was a primary recipient of the digital message;
an indication of whether the digital message has been opened;
an indication of whether the digital message has been forwarded; or
an indication of whether the digital message has been replied to.

18. The method of claim 15, further comprising:

storing an association between the archival score and the digital message; and where archiving the digital message comprises:

determining that the archival score satisfies the threshold based on the association.

19. The method of claim 15, further comprising:

receiving another user input indicating that the digital message is to be archived; and where archiving the digital message comprises:

archiving the digital message based on receiving the other user input.

20. The method of claim 15, where the visual representation of the archival weight value includes a slider, and where the archival weight value is adjusted based on moving a portion of the slider.

* * * * *